UNITED STATES PATENT OFFICE.

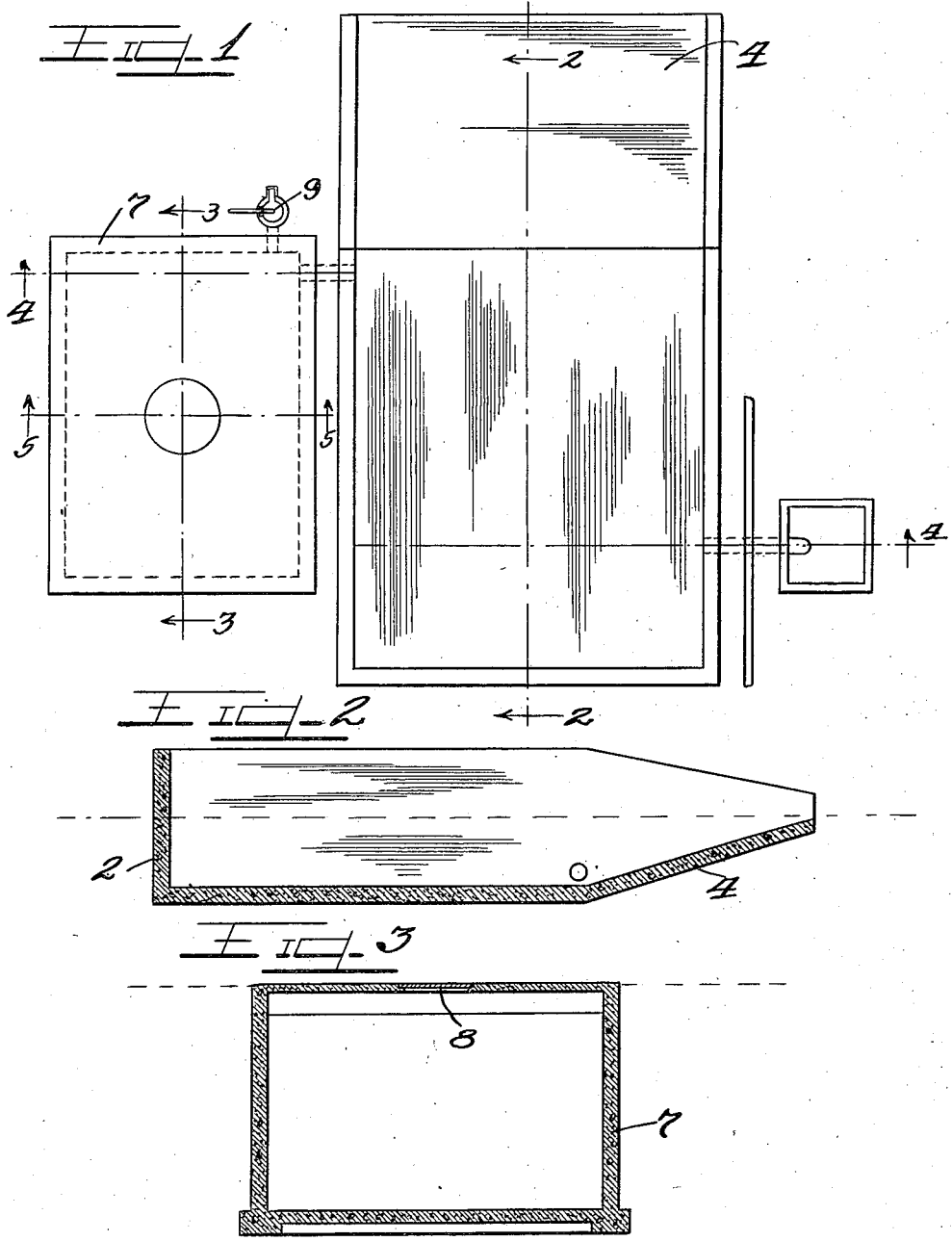

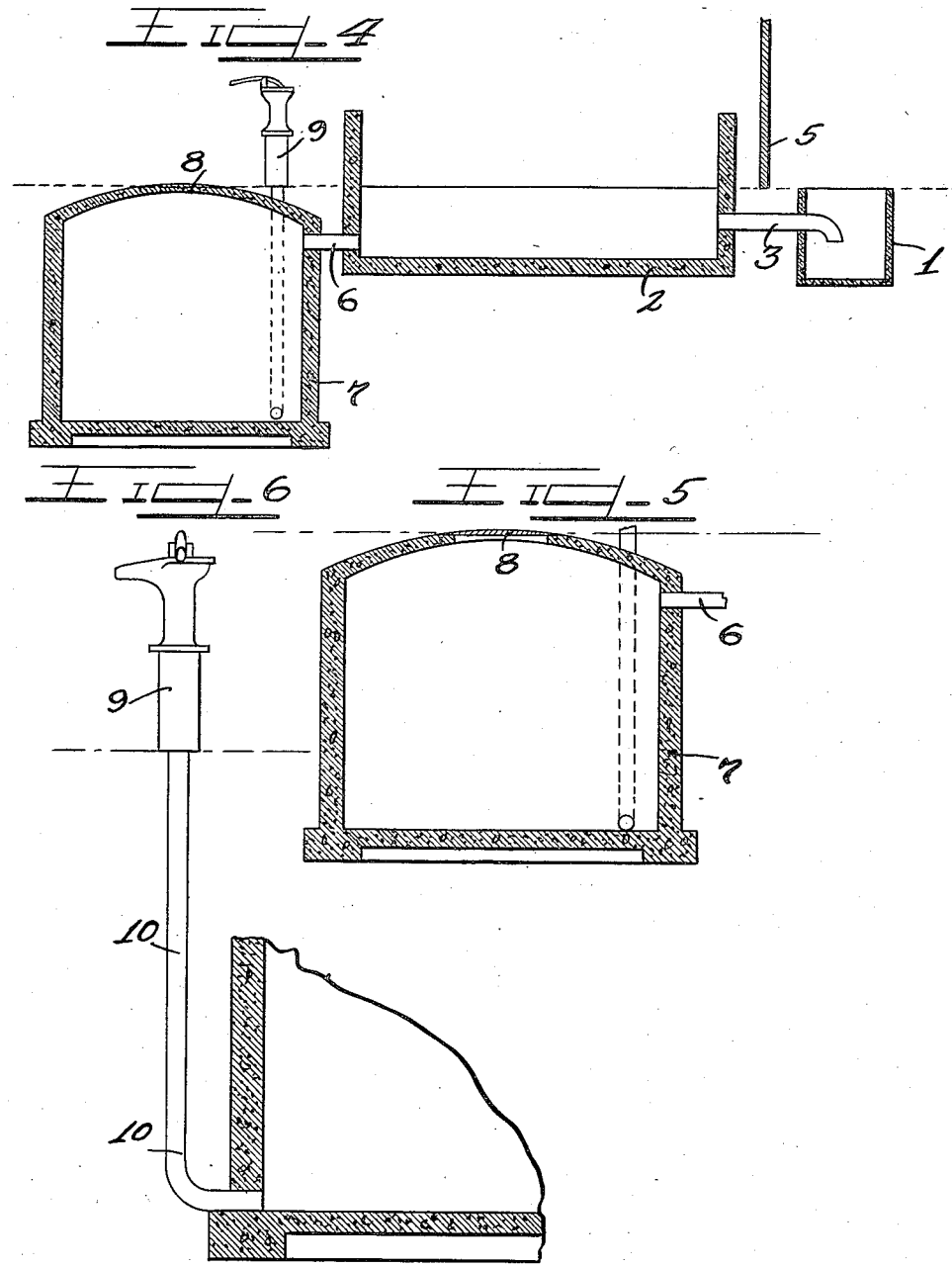

ALBERT C. ZIRWAS AND DENNIS DONOVAN, OF WAUKEGAN, ILLINOIS.

PROCESS AND APPARATUS FOR THE UTILIZATION OF STABLE PRODUCTS FOR MAKING FERTILIZER.

1,369,871.   Specification of Letters Patent.   Patented Mar. 1, 1921.

Application filed October 18, 1920. Serial No. 417,600.

*To all whom it may concern:*

Be it known that we, ALBERT C. ZIRWAS and DENNIS DONOVAN, citizens of the United States, and residents of the city of Waukegan, in the county of Lake and State of Illinois, have invented certain new and useful Improvements in Processes and Apparatus for the Utilization of Stable Products for Making Fertilizer; and we do hereby declare that the following is a full, clear, and exact description of the same, reference being had to the accompanying drawings, and to the numerals of reference marked thereon, which form a part of this specification.

This invention relates to a method for utilizing the liquid products from stables to decompose the refuse and waste vegetable matter of farms whereby the same may be used as fertilizer. This invention also relates to means for collecting and storing the liquid matter that may drain from the decomposed mass of matter whereby it may also be used as plant food.

It is therefore an object of this invention to provide means for collecting the urine and liquid matter from stables and passing it through a mass of refuse or vegetable matter to decompose the same.

It is a further object of this invention to provide means for collecting the liquid matter that may drain from the mass of decomposing matter after a state of saturation.

Other and further important objects of this invention will be apparent from the disclosures in the specification and drawings.

The invention (in a preferred form) is illustrated in the drawings and hereinafter more fully described.

On the drawings:

Figure 1 is a top plan view of an apparatus involving this invention.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a fragmentary section of Fig. 1 showing the liquid pump in the storage tank.

As shown in the drawings:

In Figs. 1 and 4, we have shown the apparatus used in draining the liquid products from stables. While the apparatus is shown as constructed from concrete, this is merely for purposes of illustration since we contemplate using whatever material good practice may suggest. In the use of our invention, it is contemplated that the drainage system in stables will convey the liquid products which consist mostly of urine and solid suspended matter to the catch basin 1, which is placed at a convenient point in the stable and which may be of any form or design, and as shown the same consists of a square box member made of moldable material.

The catch basin 1 communicates with a depository tank 2 by means of a vitrified pipe 3. The depository tank is preferably constructed with an upwardly inclined floor extension 4, as shown in Figs. 1 and 2, for the purpose of facilitating access thereto when the tank is emptied of its contents, which may be shoveled out. The tank 2 is preferably placed without the wall 5 of the barn or stable and may be located any convenient distance therefrom and is designed to receive the farm refuse and waste vegetable matter which it is desired to convert into fertilizer by decomposition.

The liquid products entering the tank 2 will seep through the mass of refuse or vegetable matter therein and saturate the same; the uric acid and other chemical agents that are usually found in the liquid products will assist in decomposing the vegetable matter and refuse in the tank. The thoroughly moistened and saturated mass will accordingly slowly decompose due to the action of this liquid product.

To prevent over-saturation of the mass of refuse and to collect the drainage therefrom, the tank 2 connects near the bottom thereof with a storage tank 7 by means of a pipe 6 which enters the storage tank near the top. The storage tank may be of any construction; as shown it is composed of an integral structure of concrete or moldable material having an arched cover in which an aperture may be covered by a lid 8. The height of the liquid in the tank can be easily watched through the aperture and when a sufficient amount has been collected it may be drawn off through the pump 9 connecting by means of a pipe 10 with the lower part of the tank, as shown in Fig. 6. The liquid may then be used as liquid fertilizer in spraying plants, etc.

The operation is as follows:

The liquid products from the barn or stable collect in the catch basin 1 and when a sufficient height has been reached it will be siphoned through the pipe 3 into the depository tank 2, where it will seep into and through the mass of refuse vegetable matter or the like that has been placed therein to be decomposed. The action of the liquid products will readily decompose the same and impart thereto some of the plant food elements that it contains. The surplus liquid products and drainage that results from over-saturation of the mass or from pressure or other causes will find its exit through the pipe 6 into the storage tank 7. When a sufficient quantity of liquid products has collected in the storage tank 7, the same may be pumped out and used as plant food. And when the mass of refuse vegetable matter in the depository tank 2 has been thoroughly decomposed, it is removed and used as a highly concentrated form of fertilizer, and a new mass of refuse placed therein.

It will accordingly be observed that we have devised in the present embodiment of our invention an apparatus designed to collect the liquid products from stables and utilize the same for making fertilizer by having the same act upon a collected mass of vegetable refuse matter and to finally collect the surplus or drainage.

We are aware that numerous details of construction may be varied through a wide range without departing from the principles of this invention, and we therefore do not purpose limiting the patent granted otherwise than necessitated by the prior art.

We claim as our invention:

1. The process of converting vegetable refuse or the like into fertilizer, consisting in placing the same in a depository and subjecting the same to the action of the liquid products from stables.

2. The process for utilizing the liquid products of stables for making fertilizer, which consists in collecting the same and siphoning it into a depository tank containing refuse vegetable matter.

3. The process for utilizing the liquid products from stables for making fertilizer, which consists in placing refuse vegetable matter in a depository tank and siphoning the liquid products from the stable into said depository tank to act upon said matter, and collecting the drainage from said tank.

4. An apparatus for utilizing the liquid products from stables for making fertilizer comprising a catch basin, a depository tank communicating therewith, and a liquid storage tank for receiving and storing the drainage from the depository tank.

5. An apparatus for utilizing the liquid products from stables for making fertilizer, comprising a catch basin, a depository tank communicating therewith, a liquid storage tank communicating with said depository tank, and means for removing liquid from said storage tank.

6. An apparatus for utilizing the liquid products from stables for making fertilizer, comprising a catch basin, and a depository tank communicating therewith for receiving a mass of refuse vegetable matter.

In testimony whereof, we have hereunto subscribed our names in the presence of two subscribing witnesses.

ALBERT C. ZIRWAS.
DENNIS DONOVAN.

Witnesses:
EDWARD SCHULTZ,
LAVINIA S. FUQUA.